United States Patent [19]

Hammer et al.

[11] Patent Number: 5,316,809
[45] Date of Patent: May 31, 1994

[54] TUBULAR PACKAGING CASING, PARTICULARLY SAUSAGE CASING, BASED ON CELLULOSE

[75] Inventors: Klaus-Dieter Hammer, Mainz-Mombach; Manfred Siebrecht, Wiesbaden, both of Fed. Rep. of Germany

[73] Assignee: Hoechst Aktiengesellschaft, Frankfurt/Main, Fed. Rep. of Germany

[21] Appl. No.: 700,400

[22] Filed: May 15, 1991

[30] Foreign Application Priority Data

May 16, 1990 [DE] Fed. Rep. of Germany ....... 4015659

[51] Int. Cl.$^5$ .............................................. A22C 13/00
[52] U.S. Cl. ................................... 428/348; 427/230; 427/394; 427/392; 426/135; 426/105; 138/118.1; 206/802
[58] Field of Search .......................... 206/802; 428/34.8; 138/118.1; 427/230, 394, 392; 426/135, 105

[56] References Cited

U.S. PATENT DOCUMENTS

| | | | |
|---|---|---|---|
| 4,248,912 | 2/1981 | Gerigk et al. | 428/34.8 |
| 4,287,217 | 9/1981 | Hammer et al. | 426/105 |
| 4,303,711 | 12/1981 | Erk et al. | 428/36 |
| 4,357,371 | 11/1982 | Heinrich et al. | 427/238 |
| 4,463,778 | 8/1984 | Judd et al. | 138/118.1 |
| 4,529,634 | 7/1985 | Hammer et al. | 428/348 |
| 4,623,566 | 11/1986 | Kastl et al. | 428/34.8 |
| 4,741,938 | 5/1988 | Kastl et al. | 428/34.8 |
| 4,871,791 | 10/1989 | Hammer et al. | 524/35 |

*Primary Examiner*—Alexander S. Thomas
*Assistant Examiner*—Charles R. Nold
*Attorney, Agent, or Firm*—Foley & Lardner

[57] ABSTRACT

A tubular packaging casing, in particular sausage casing, including a cellulose base layer and a barrier layer against steam and atmospheric oxygen, which is free from chlorine. The barrier layer includes random copolymer based on copolymerized vinyl monomers. The vinyl monomers correspond to the general formula $CH_2=CR^1-X$, wherein $R^1$ denotes a methyl group or hydrogen, and
X denotes a ($-OCOR^2$) group or a ($-CO_2R^2$) group, with $R^2$ denoting an alkyl group having 1 to 20, preferably 1 to 10, and in particular 1 to 5 carbon atoms.

In a further embodiment, the copolymer also includes copolymerized vinyl monomers of the above formula except that X denotes a ($CO_2H$) group or a (CN) group.

42 Claims, No Drawings

TUBULAR PACKAGING CASING, PARTICULARLY SAUSAGE CASING, BASED ON CELLULOSE

BACKGROUND OF THE INVENTION

The present invention relates to a tubular packaging casing, in particular to a sausage casing, which is based on cellulose, particularly fiber-reinforced cellulose, and comprises a barrier layer against atmospheric oxygen and steam.

U.S. Pat. No. 4,287,217 discloses a casing comprising fiber-reinforced cellulose hydrate as the substrate material, wherein its inner surface is coated with a continuous film comprising a vinylidene chloride copolymer (PVDC) which is impermeable to water vapor and its outer surface is provided with 0.5 to 0.8 g/m² of a coating comprising polyacrylate, which due to a number of interruptions is water-permeable. In the case of this known sausage casing, the inner PVDC layer constitutes the barrier layer, and the permeable acrylate coating applied to the outer surface has the purpose of reducing the sensitivity of the sausage casing to damage due to mechanical shocks, and its undesirable tendency to tear open when being cut through. Because of the barrier layers present on their internal surfaces, sausage casings of this type are employed for the production of cooked and scalded sausages. Application of the polyacrylate dispersion to the outer surface of the casing is effected during the production of the gel-type tubing from viscose, i.e., prior to drying.

The outer surface of the cellulose casing known from U.S. Pat. No. 4,529,634 is also provided with a polyacrylate coating, which has, however, a reduced weight per unit area of less than 0.5 g/m². This casing is permeable to water vapor and is intended for use as a sausage casing for air-dried, uncooked sausages of the salami-type. It is not suited for the production of cooked sausages.

Barrier layers based on PVDC have the advantage that virtually no water exudes from the finished sausage during storage, and that even after a relatively long storage period, the casing still surrounds the sausage meat in a tight and creasefree manner. Sausages of the liverwurst-type, whose meat assumes an unattractive appearance when exposed to atmospheric oxygen, remain unchanged, for the PVDC layer also is a barrier towards atmospheric oxygen and prevents the latter from penetrating into the sausage meat. For example, a fiber-reinforced cellulose casing with a 10 to 12 μm thick coating of PVDC has an extremely low permeability to water vapor of 0.5 to 2 g/(m²×24 h) and also an extremely low permeability to oxygen of 2.5 to 4 cm³/(m²×24 h×bar) (each time measured in accordance with DIN 53,122, using samples having a surface area of 5 cm²). The weight loss of cooked sausages surrounded by the casings of fiber-reinforced cellulose with internal PVDC barrier layers is about 0.5 to 1.5% per week (storage in a cold chamber at 7° C., 65% relative humidity, sausage diameter 60 mm).

Casings of this type exhibit the disadvantage that due to their PVDC content problems may arise in connection with waste disposal, i.e., the disposal of the peeled-off casings. Particularly problematic is the formation of HCl and organic chlorine compounds during combustion of the casings. For example, if the weight of the PVDC coating is about 10 g per m² of casing material, the amount of organically-bound chlorine present is about 60 g per kg of casing material.

SUMMARY OF THE INVENTION

It is therefore an object of the present invention to provide a casing, in particular a sausage casing for cooked sausages, which is impermeable to water vapor and oxygen and is provided with an alternative, chlorine-free coating which exhibits good barrier properties similar to PVDC without causing problems in connection with its disposal.

In accomplishing the foregoing objects there is provided according to the present invention a tubular packaging casing, in particular a sausage casing, comprising an optionally fiber-reinforced cellulose base layer and a barrier layer having a weight per unit area of at least about 12 g/m² and comprising at least one random copolymer formed from copolymerizable first vinyl monomers, wherein the vinyl monomers are represented by the general formula $CH_2=CR^1-X$, where $R^1$ denotes a methyl group or a hydrogen atom, and X denotes a ($-OCOR^2$) group or a ($CO_2R^2$) group, with $R^2$ denoting an alkyl group having about 1 to 20, preferably 1 to 10, and in particular 1 to 5 carbon atoms.

In another embodiment, the copolymer also can comprise at least one copolymerizable second vinyl monomer of the above general formula, except that X denotes a ($CO_2H$) group or (CN) group.

In a further embodiment, the copolymer also can include at least one third monomer selected from the group consisting of vinyl acetal, butadiene, isoprene, styrene, crotonic acid and an ester thereof, itaconic acid and an ester thereof and maleic acid and an ester thereof.

There also is provided according to the present invention a process for producing a tubular packaging casing, in particular a sausage casing, comprising the steps of providing an optionally fiber-reinforced cellulose tubing having an inner surface and an outer surface, coating at least one of the inner and outer surfaces with an aqueous dispersion containing about 13 to 40% by weight of at least one copolymer as described above, removing the dispersant and heating the coated tube to a temperature of between about 130° and 170° C.

Further objects, features and advantages of the present invention will become apparent from the detailed description of preferred embodiments that follows.

DETAILED DESCRIPTION OF THE PREFERRED EMBODIMENTS

The casing material itself is cellulose, i.e., cellulose hydrate which is also referred to as regenerated cellulose or transparent cellulose film. The packaging casing is in the form of a seamless tubing, but it may also be a tubing having a longitudinal seam obtained, for example, by folding a cellulose film web along its longitudinal axis and bonding its overlapping edges to one another. The packaging casing may be non-reinforced, but preferably it is fiber-reinforced. The fiber-reinforced casing, which also is referred to as a "fiber casing", is in particular used for large diameter sausages. Accordingly, the fiber-reinforced tubular packaging casings have diameters of between about 30 and 180 mm. The reinforcement is comprised of a fiber web bent into a tubular shape, and the cellulose is applied to the inner and/or outer surface of said fiber web.

In contrast to the conventional barrier layers based on PVDC, the barrier layer according to the present invention can be applied directly to the relatively coarse surface of the fiber reinforcement, without detachment of the barrier layer from the substrate being observed. Thus, no cellulose layer is required between the barrier layer and the fiber reinforcement. The fiber reinforcement essentially comprises the usual long fiber papers based on solidified hemp-fiber non-wovens, but it is also possible to employ other planar textile materials.

The cellulose tubing to be coated is produced in a conventional manner by means of the viscose process. In this process, a tubing or a web of fibers shaped into a tubing, which is, e.g., comprised of paper or hemp fibers, is coated with alkaline viscose solution spun through an annular die onto the inner and/or outer surface of the fiber tubing and is then treated with an acidic precipitation liquid which causes coagulation of the viscose. If desired, the viscose solution contains dye pigments required to produce a white or colored casing. For producing non-reinforced cellulose casings, the viscosed solution is extruded directly into the coagulation bath through an annular die. The resulting tubing of cellulose hydrate gel, which optionally is fiber-reinforced, is passed through the conventional washing and plasticizing baths. Prior to drying, the surface of the tubing where the barrier layer is to be applied may be provided with a coating, preferably of a cationic resin solution, forming an adhesion-promoting layer between the barrier layer and the fiber-reinforcement. The coating is applied in a conventional manner, e.g., by immersion into a liquid bath, by means of roller application or by spraying. To improve the adhesive strength of the copolymer barrier layer, it is, e.g., possible to apply the cationic resin coatings customarily used to improve the adhesion of PVDC barrier layers, while they are still in their water-soluble forms. During the subsequent drying process, these resins are cross-linked and thus converted into their water-insoluble forms. Advantageous resin solutions in particular include aqueous epichlorohydrin-polyamine-polyamide solutions, which are commercially available. The concentration of these resin solutions varies between about 0.8 and 5% by weight, in particular between about 1 and 3% by weight. During the subsequent drying process, the water content is reduced to 7 to 15%. The resulting dried cellulose tubing has a customary plasticizer content of preferably about 15 to 30% by weight, relative to the weight of the casing, and is employed in this form for coating with the copolymer according to the present invention.

Expediently, the adhesion-promoting coating liquid also includes the plasticizer for the cellulose, which preferably comprises mono- or polyhydric alcohols, such as glycerol and/or propane diol (propylene glycol) or mixtures thereof in customary amounts.

The inner and/or outer surface of the packaging casing is/are provided with the barrier layer according to the present invention. In general, a single coating, i.e., a coating applied to the inner or to the outer surface of the tubing, is sufficient. In a preferred embodiment, the coating is only applied to the inner surface of the cellulose casing. Thus, the uncoated cellulose material on the outside of the casing can dry out and shrink after the cooking or scalding of the sausage, so that the sausage casing surrounds the sausage meat tightly and without the formation of creases.

The barrier layer according to the present invention forms an uninterrupted, continuous film and has a weight per unit area which is sufficiently high to reduce the permeability of the cellulose casing to water vapor to a value of not more than 50 g/(m$^2 \times$24 h). The permeability to oxygen of the casing shall be reduced by the coating to values of not more than 50 g/(m$^2 \times$24 h$\times$bar) (each time determined according to DIN 53,122, using samples having a surface area of 5 cm$^2$, a water content of 8 to 10% by weight and a glycerol content of 20% by weight). These values are obtained when the barrier layer has a weight of at least about 12 g/per m$^2$ of casing surface, it being possible for the gas-tight coating having a weight within this range to be present on the inner and/or outer surface of the casing. In general, the barrier layer has a weight per unit area of at least about 14 to 15 g/m$^2$, in order to make sure that the permeability values are as low as possible. Optimum properties are achieved with coating thicknesses corresponding to a weight per unit area of about 18 to 25 g/m$^2$, in particular of about 20 to 30 g/m$^2$, either on the inner or outer surface of the casing. By increasing the coating thickness, the permeability to water vapor can be reduced to a value of about 5 g/(m$^2 \times$24 h), and the permeability to oxygen can be reduced to a value of about 5 cm$^3$/(m$^2 \times$24 h$\times$bar).

The copolymer of the barrier layer is composed of vinyl monomers and is substantially non-tacky, which is achieved by adjusting the average molecular weight of the copolymer to as high as possible value. As is known, high molecular weights are reached by carrying out the polymerization very slowly. To extend the reaction time, the mixture of compounds to be polymerized is subjected to adequate cooling. To select which commercially available copolymers are particularly suited for the purpose of this invention, the relative viscosity of the copolymer in the organic solvent is evaluated. In dimethylformamide (DMF), the relative viscosity value should be at least about 2.6, in particular at least about 3.0, for a 1% strength copolymer solution.

To determine the above value, the dispersed or dissolved commercial product is precipitated by the addition of acid, purified with water and dried. Then a 1% strength solution in DMF is prepared, and the relative viscosity is determined by means of the following equation:

$$\text{relative viscosity} = \frac{t_L \times D_L}{t_{LM} \times D_{LM}} \ (20° \text{ C.})$$

wherein,
$t_L$ denotes the flow time of the solution,
$D_L$ denotes the density of the solution,
$t_{LM}$ denotes the flow time of the solvent, and
$D_{LM}$ denotes the density of the solvent.

The flow time is determined by means of a capillary having a diameter of 0.5 mm (KPG viscosimeter according to Ostwald).

If the synthetic coating according to the present invention is to be applied to the inner surface of the casing, it is expedient also to add a wax, for example, a vegetable wax, such as candelilla wax, carnauba wax or montan wax; an animal wax, such as beeswax; a mineral wax, such as a polyolefin wax comprised of n- and iso-paraffins; or a synthetic wax, such as a wax based on oxazoline. Chemically-modified montan wax (KPS-type, manufactured by Hoechst AG) is particularly well-suited. These waxes are described in detail in EP-A-0,100,056, as additives to hydrophilic copolymers.

Furthermore, it is expedient to add a slip agent to the copolymer coating. Particularly suited are finely divided solid particles possessing adequate thermal stability to prevent them from melting during the drying of the copolymer dispersion applied to the casing. Suitable slip agents of this type include pigments based on $SiO_2$, $CaCO_3$ and aluminum silicate, which have an average particle size of less than about 4 μm, in particular of less than about 2 μm.

The barrier layer is comprised of one or several copolymers. Advantageously, these copolymers of the barrier layer comprise at least two, preferably two to four, first vinyl monomers, which preferably carry hydrophilic groups and correspond to the general formula $CH_2=CR^1—X$ where $R^1$ denotes a methyl group or hydrogen atom and X denotes a ($—OCOR^2$) group or a ($—CO_2R^2$) group, $R^2$ denoting an alkyl group having about 1 to 20, preferably about 1 to 10, and in particular about 1 to 5 carbon atoms. If X is a ($—OCR^2$) group, $R^2$ preferably is a methyl, ethyl or propyl radical. If X is a ($—CO_2R^2$) group, $R^2$ preferably is a methyl, ethyl, propyl, isopropyl, butyl or isobutyl radical.

Other second vinyl monomers which additionally can be present in the copolymer, in an amount of up to about 45% by weight, are acrylic acid, methacrylic acid, acrylonitrile and methacrylonitrile. However, in general the proportion of these co-monomers is relatively low. In the copolymer, methacrylic acid or acrylic acid is usually present in an amount of about 0.1 to 20% by weight and methacrylonitrile or acrylonitrile is usually present in an amount of about 0.1 to 35% by weight.

Instead of, or in addition to, these second vinyl monomers, further third vinyl monomers can be present in the copolymer. These include the following monomers: vinyl acetal, butadiene, isoprene, styrene, crotonic acid or its ester, itaconic acid or its ester and maleic acid or its ester, wherein the alcohol component of the esters has about 1 to 10, in particular about 1 to 5, carbon atoms. The total proportion of these further vinyl monomers does not exceed about 45% by weight. The proportion of all the second and third vinyl monomers is less than about 50% by weight, so that the first co-monomers represent the major proportion of the copolymer.

In a preferred embodiment, the copolymer is comprised of one, two or three methacrylic acid esters or acrylic acid esters, which together constitute at least about 60%, in particular at least about 85% by weight, of the copolymer.

The barrier layer on the inner and/or outer surface of the casing is produced by coating the cellulose tubing with an aqueous solution or dispersion of the copolymer and removing the solvent or dispersant by applying heat. As long as the tubing contains relatively large amounts of water, its surface temperature practically will not exceed about 100° C. When most of the water has been evaporated, the applied copolymer, which is present in the form of small globules, is sintered or melted at an elevated temperature, in particular at about 130° to 170° C., in order to produce a continuous film. The concentration of the copolymer in the coating liquid in general is between about 13 and 40% by weight, preferably about 15 to 30% by weight. If appropriate, the coating liquid includes conventional additives, such as dispersants, dyes, emulsifiers and slip agents. If the barrier layer additionally includes a wax, about 0.5 to 3% by weight, relative to the copolymer, of the wax is also added to the coating liquid. If appropriate, the coating liquid also includes about 0.5 to 2% by weight, relative to the copolymer, of a heat-resistant, in particular inorganic, pigment as a slip agent.

The coating liquid for the barrier layer is applied in a conventional manner employing devices which are customarily used for the production of internal and external coatings for cellulose tubings. Evaporation of the coating liquid and melting of the copolymer into a continuous, uninterrupted synthetic film are likewise performed with the aid of customary drying devices.

Due to its barrier layer, the tubular casing according to the present invention is particularly well-suited as a sausage casing for cooked and scalded sausages. So far, casings for this type of sausages have been provided with PVDC barrier layers. When sausages having a diameter of 60 mm and a length of 50 cm are stored in a cold chamber (7° C., 65% rel. humidity), the weight loss due to exuded water is 1.5% to a maximum of 4% per week.

Although the full extent of barrier properties of PVDC barrier layers are somewhat better than the barrier layer according to this invention, the values which can be achieved are adequate for a great number of sausage types. In view of the problem-free disposal of the peeled-off casings, the casings of this invention represent an advantageous alternative.

As usual, the finished tubular casing is laid flat and stored in the form of rolls or further processed into individual sections which are tied-off at one end or shirred to give concertina-shaped sections. The coating possesses sufficient mechanical stability and flexibility and sufficiently good elongation properties to withstand all processing steps without being damaged. Moreover, it does not become brittle during storage. The water and plasticizer content of the casing is within the limits customary for sausage casings based on cellulose.

The present invention will now be illustrated in greater detail by means of the Examples which follow.

Aqueous dispersions containing the following copolymers are used for internally coating a fiber-reinforced cellulose tubing having a diameter of 60 mm:

a)

49.5% of butyl acrylate,
49.5% of methyl methacrylate, and
1.0% of acrylic acid/relative viscosity 3.1 b)

47.0% of butyl acrylate,
47.0% of methyl methacrylate,
1.0% of acrylic acid, and
5.0% acrylonitrile/relative viscosity 2.8 c)

46.0% of ethyl acrylate,
46.0% of methyl methacrylate,
2.0% of acrylic acid, and
6.0% of acrylonitrile/relative viscosity 3.4 d)

30.0% of butyl acrylate,
30.0% of ethyl acrylate,
30.0% of methyl acrylate,
8.0% of acrylonitrile, and
2.0% of acrylic acid/relative viscosity 3.4

The tubular cellulose casing to be coated contains a fiber paper insert, which on its inner surface and on its outer surface is provided with a coating of regenerated cellulose. The cellulose layers were obtained by coating both surfaces of the fiber paper with an alkaline viscose solution, followed by coagulation of the viscose. To ensure firm anchoring of the barrier layer, the inner surface of the tubing is provided with an adhesion-promoting coating of a heat-cured polyamine-polyamide epichlorohydrin resin. It is known to use this type of resin as an adhesion promoter for PVDC barrier layers on cellulose films. The tubing is filled with an aqueous dispersion having the following composition:

20.0 to 30.0% b.w. of one of copolymers a) to d),
2.0 to 3.0% b.w. (rel. to copolymer) of KPS wax,
0.6 to 0.8% b.w. (rel. to copolymer) of pigments of aluminum silicate, average particle size less than 1 μm as a slip agent.

The tubing is transported upwards vertically to allow excess dispersion to run off, fed through a pair of metering rollers, as described in EP-A-0,037,023, then dried in the inflated state and thereafter heated to 160° C., whereby the copolymer particles melt together to form a continuous coating.

After drying, the casings have an inner barrier layer weighing between about 18 to 25 g/m². The coating weight can be determined by dissolution using DMF. The tubular casing is re-moistened and shirred to give shirred sticks. Even after a storage period of one week under tropical conditions (38° C., 86% rel. humidity), the shirring creases show no damage, i.e., they still are sufficiently tight.

Casing sections having a length of 50 cm are stuffed with sausage meat of the cooked sausage-type. The weight loss of the sausages exhibited during storage in a cold chamber due to loss of water is satisfactorily low; even after a storage period of 6 weeks the casing surrounds the sausage meat tightly and without creases. Likewise, liverwurst-type sausages prepared in the same way do not show any signs of discoloration after a storage period of 4 to 6 weeks. Thus, it can be stated that the permeability of the casing to water vapor and atmospheric oxygen is satisfactorily low.

The individual results are compiled in the table below. The values indicated for permeability and weight loss are average values.

The copolymer having the composition a) results in an internal coating imparting particularly good peeling properties to the casing. An appropriate selection of the copolymers thus also helps to adjust the adhesion and ease of peeling to the desired favorable values.

TABLE

| | Copolymer Concentration (%) | Amount applied (g/m2) | Permeability to $O_2$ (*) | Permeability to $H_2O$ (**) | Weight loss per week (%) |
|---|---|---|---|---|---|
| a | 20 | 18 | 9.5 | 12.0 | 2.2 |
| b | 25 | 22 | 6.8 | 6.5 | 1.8 |
| c | 28 | 20 | 8.0 | 16.0 | 2.5 |
| d | 30 | 25 | 10.5 | 18.0 | 3.0 |

(*) cm³/(m² × 24 h × bar)
(**) g/(m² × 24 h)

$R^1$ denotes a methyl group or a hydrogen atom, and X denotes a

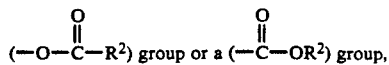

with $R^2$ denoting an alkyl group having about 1 to 20 carbon atoms,
wherein the barrier layer renders the casing substantially impermeable to water vapor and oxygen.

2. A casing according to claim 1, wherein said cellulose base layer comprises a fiber-reinforced cellulose.

3. A casing according to claim 2, wherein said fiber reinforcement comprises a web of fibers shaped into a tubing.

4. A casing according to claim 3, wherein the barrier layer is disposed on the web of reinforcing fibers.

5. A casing according to claim 4, further comprising an adhesive layer between the barrier layer and the reinforcing fiber web, wherein the adhesive layer comprises a coating of a cationic resin solution.

6. A casing according to claim 1, wherein said barrier layer has a weight per unit area of at least about 14 g/m² of casing surface.

7. A casing according to claim 6, wherein said barrier layer has a weight per unit area of about 18 to 25 g/m² of casing surface.

8. A casing according to claim 1, wherein $R^2$ denotes an alkyl group having about 1 to 10 carbon atoms.

9. A casing according to claim 6, wherein $R^2$ denotes an alkyl group having about 1 to 5 carbon atoms.

10. A casing according to claim 1, wherein at least one of the copolymers further comprises at least one copolymerizable second vinyl monomer of the general formula $CH_2=CR^1-Y$, wherein $R^1$ denotes a methyl group or a hydrogen atom and wherein Y denotes a ($CO_2H$) group or a (CN) group.

11. A casing according to claim 10, wherein the copolymer comprises as a first component at least one first vinyl monomer selected from the group consisting of methyl acrylate, ethyl acrylate, propyl acrylate, butyl acrylate, methyl methacrylate, ethyl methacrylate, propyl methacrylate and butyl methacrylate and as a second component at least one second vinyl monomer selected from the group consisting of methacrylic acid, acrylic acid, methacrylonitrile and acrylonitrile, wherein the first component is present in amount greater than the second component.

What is claimed is:

1. A tubular packaging casing, comprising a cellulose base layer and a barrier layer having a weight per unit area of at least about 12 g/m² of casing surface and comprising at least one random copolymer formed from copolymerizable first vinyl monomers wherein the vinyl monomers are represented by the general formula $CH_2=CR^1-X$, wherein 12. A casing according to claim 10, wherein the second vinyl monomer comprises methyacrylonitrile or acrylonitrile and is present in an amount of about 0.1 to 35% by weight, relative to the copolymer.

13. A casing according to claim 10, wherein the total amount of the second vinyl monomer present is not greater than about 45% by weight, relative to the copolymer.

14. A casing according to claim 10, wherein the second vinyl monomer comprises methacrylic acid or acrylic acid and is present in an amount of about 0.1 to 20% by weight, relative to the copolymer.

15. A casing according to claim 1, wherein the copolymer or at least one of the copolymers further comprises at least one third monomer selected from group consisting of vinyl acetal, butadiene, isoprene, styrene, crotonic acid and an ester thereof, itaconic acid and an ester thereof and maleic acid and an ester thereof, wherein the alcohol component of the esters has about 1 to 10 carbon atoms.

16. A casing according to claim 15, wherein the alcohol component of the esters has about 1 to 5 carbon atoms.

17. A casing according to claim 15, wherein the total amount of the third monomer present is not greater than about 45% by weight, relative to the copolymer.

18. A casing according to claim 10, wherein the copolymer or at least one of the copolymers further comprises at least one third monomer selected from the group consisting of vinyl acetal, butadiene, isoprene, styrene, crotonic acid and an ester thereof, itaconic acid and an ester thereof and maleic acid and an ester thereof, wherein the alcohol component of the esters has about 1 to 10 carbon atoms.

19. A casing according to claim 1, wherein the copolymer comprises one to three co-monomers of acrylic acid ester, methacrylic acid ester, or a mixture thereof.

20. A casing according to claim 1, wherein said first vinyl monomer includes at least one hydrophilic group.

21. A casing according to claim 18, wherein the total amount of the second and third monomers present is less than about 50% by weight, relative to the copolymer.

22. A casing according to claim 1, wherein the barrier layer further comprises a wax selected from the group consisting of a vegetable wax, an animal wax, a mineral wax and a synthetic wax.

23. A casing according to claim 1, wherein the barrier layer further comprises a slip agent selected from the group consisting of $SiO_2$, $CaCO_3$ and aluminum silicate pigments.

24. A casing according to claim 1, wherein the barrier layer is disposed on the cellulose base layer.

25. A casing according to claim 24, further comprising an adhesive layer between the barrier layer and the cellulose base layer, wherein the adhesive layer comprises a coating of a cationic resin solution.

26. A casing according to claim 1, wherein said random copolymer consists essentially of butyl acrylate, methyl methacrylate, and acrylic acid monomers.

27. A casing according to claim 1, wherein said random copolymer consists essentially of butyl acrylate, methyl methacrylate, acrylic acid, and acrylonitrile monomers.

28. A casing according to claim 1, wherein said random copolymer consists essentially of ethyl acrylate, methyl methacrylate, acrylic acid, and acrylonitrile monomers.

29. A casing according to claim 1, wherein said random copolymer consists essentially of butyl acrylate, ethyl acrylate, methyl methacrylate, acrylic acid, and acrylonitrile monomers.

30. A casing according to claim 1, wherein the barrier layer is chlorine-free.

31. A casing according to claim 1, wherein the copolymer is formed from monomers which consist essentially of units of said general formula, wherein X denotes a

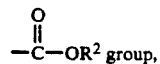

and is optionally formed from additional units of the general formula $CH_2=CR^1-Y$, wherein $R^1$ denotes a methyl group or a hydrogen atom and wherein Y denotes a ($CO_2H$) group or a (CN) group, and is optionally formed from vinyl acetal, butadiene, isoprene, styrene, crotonic acid and an ester thereof, itaconic acid and an ester thereof and maleic acid and an ester thereof, wherein the alcohol component of the esters has about 1 to 10 carbon atoms.

32. A casing according to claim 31, wherein the copolymer is formed from monomers which consist of units of said general formula, wherein X denotes a

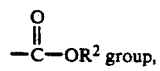

and is optionally formed from additional units of the general formula $CH_2=CR^1-Y$, wherein $R^1$ denotes a methyl group or a hydrogen atom and wherein Y denotes a ($CO_2H$) group or a (CN) group, and is optionally formed from vinyl acetal, butadiene, isoprene, styrene, crotonic acid and an ester thereof, itaconic acid and an ester thereof and maleic acid and an ester thereof, wherein the alcohol component of the esters has about 1 to 10 carbon atoms.

33. A casing according to claim 1, wherein the copolymer is not formed from vinyl acetate monomers.

34. A casing according to claim 1, which has a permeability to water vapor of not more than 50 g/($m^2 \times 24$ L) and a permeability of oxygen of not more than 50 g/($m^2 \times 24$ h$\times$bar).

35. A process for producing a tubular packaging casing comprising the steps of:
 (a) providing an optionally fiber-reinforced cellulose tubing having an inner surface and an outer surface,
 (b) coating at least one of the inner and outer surfaces with an aqueous dispersion containing about 13 to 40% by weight of at least one random copolymer formed from copolymerizable first vinyl monomers, wherein the vinyl monomers are represented by the general formula $CH_2=CR^1-X$, wherein $R^1$ denotes a methyl group or a hydrogen atom, and X denotes a ($-OCOR^2$) group or a ($-CO_2R^2$) group, with $R^2$ denoting an alkyl group having about 1 to 20 carbon atoms,
 (c) removing the dispersant, and
 (d) heating the coated tubing to a temperature of between about 130° and 170° C. in order to form a barrier layer of the copolymer having a weight per unit area of at least about 12 g/$m^2$, and which is substantially impermeable to water vapor and oxygen.

36. A process according to claim 35, wherein the aqueous dispersion contains about 15 to 30% by weight of the copolymer.

37. A process according to claim 35, further comprising an additional step after step (a) and prior to step (b), which comprises coating a cationic resin solution on the surface or surfaces to be coated during said step (b).

38. A process according to claim 35, wherein the copolymer or at least one of the copolymers further comprises at least one copolymerizable second vinyl monomer of the general formula, except that X denotes a ($CO_2H$) group or a (CN) group.

39. A process according to claim 35, wherein the copolymer or at least one of the copolymers further comprises at least one third monomer selected from the group consisting of vinyl acetal, butadiene, isoprene, styrene, crotonic acid and an ester thereof, itaconic acid and an ester thereof and maleic acid and an ester thereof.

40. A process according to claim 35, wherein the aqueous dispersion further includes about 0.5 to 3% by weight, relative to the copolymer of a wax selected from the group consisting of a vegetable wax, an animal wax, a mineral wax and a synthetic wax.

41. A process according to claim 35, wherein the aqueous dispersion further includes about 0.5 to 2% by weight, relative to the copolymer, of a slip agent selected from the group consisting of $SiO_2$, $CaCO_3$ and aluminum silicate pigments.

42. A sausage casing comprising a tubular packaging casing according to claim 1.

* * * * *